United States Patent

Suozzo

[15] 3,669,391
[45] June 13, 1972

[54] MECHANICAL SHOCK AND SWAY ARRESTOR

[72] Inventor: Leonard S. Suozzo, 366 Maple Hill Drive, Hackensack, N.J. 07601

[22] Filed: Oct. 14, 1970

[21] Appl. No.: 80,659

[52] U.S. Cl. .................................................. 248/54 R, 248/58
[51] Int. Cl. .......................................................... F16l 3/16
[58] Field of Search ........................ 248/54 CS, 54 R, 58, 60

[56] References Cited

UNITED STATES PATENTS

| 3,112,909 | 12/1963 | Suozzo .................................. 248/58 |
| 2,981,512 | 4/1961 | Zollinger .............................. 248/58 |
| 3,103,333 | 9/1963 | Suozzo .................................. 248/58 |

FOREIGN PATENTS OR APPLICATIONS 906,496    9/1962    Great Britain .......................... 248/58

*Primary Examiner*—Chancellor E. Harris
*Attorney*—F. J. Pisarra

[57] ABSTRACT

A mechanical arrestor for protecting equipment, such as high temperature piping, vessels or the like, against shock loading or undesirable vibratory movement while permitting requisite movement of the equipment due to normal changes in the temperature or thermal movement of the equipment. The arrestor is comprised of a rigid strut unit, which is adjustable in effective length and is anchored at one end to a stationary structure and at its other end to the equipment, and a control unit which is coupled to and automatically adjusts the effective length of the strut unit in response to said changes in temperature or thermal movement of the equipment.

11 Claims, 4 Drawing Figures

INVENTOR.
LEONARD S. SUOZZO
BY F. J. Pisarra
Attorney

3,669,391

MECHANICAL SHOCK AND SWAY ARRESTOR

BACKGROUND OF THE INVENTION

This invention relates to the art of shock and sway arrestors and, more particularly, to a completely mechanical device for protecting piping or other equipment which may be subjected to shock loading, swaying, vibratory movement or other similar undesirable conditions during normal use.

The term "piping," as used in this description and in the claims, includes without limitation, high temperature piping, steam boilers, high temperature vessels and the like.

The shock and sway arrestor of this invention (hereinafter also referred to by the shortened designation "arrestor") constitutes, in effect, a structural device which is so constructed and arranged as to accommodate normal thermal movement of piping. To this end, the arrestor permits the piping to move freely and unrestrictedly through its normal operating range. However, and in the event the piping is subjected to a sudden shock or other displacement force, the arrestor becomes a rigid strut or snubber and transfers such force to a stationary structure, such as a building, at the instant the shock force occurs.

The arrestor of this invention has numerous uses including, for example, arresting movement of piping against undesirable sway and vibration forces, such as those caused by earthquakes; preventing possible damage to outdoor piping installations due to wind conditions; and protecting piping from damage from shock loading, such as those created by quick closing valves, water hammer, relief valve reaction or other possible causes.

There have been a number of developments in recent years in the field of shock and sway arrestors. Such arrestors include a category employing a hydraulic unit and intended for use with piping. While hydraulic arrestors represent advances in the art and are satisfactory for use in open and readily accessible locales, they are not acceptable for use in locations that are difficult or virtually impossible of access after installation. The reason for this is that the hydraulic unit, due to unavoidable leakage of its hydraulic fluid, requires periodic replenishment of such fluid.

The arrestor of this invention is free of the objections to hydraulic arrestors as it is completely mechanical. Moreover, the present arrestor does not require servicing or maintenance in use, and, for this reason, may be advantageously employed in locations that are normally inaccessible following installation.

SUMMARY OF THE INVENTION

As was stated earlier herein, the arrestor of this invention is intended for use with piping and a stationary structure to protect the piping against shock loading, undesirable vibratory movement or the like. The arrestor comprises basically support means, a rigid strut unit and a control unit. The support means is adapted to be secured to the piping or to the stationary structure. The strut unit is carried by the support means and comprises a device which is adapted to be connected at one end to the piping and at its other end to the stationary structure. The device includes adjusting means intermediate its ends for varying the effective length of the strut unit. The control means is also carried by the support means and is coupled to the adjusting means. The control unit is responsive to thermal movement of the piping relative to the stationary structure and actuates the adjusting means to thereby correspondingly vary the effective length of the strut unit.

The principal object of this invention is to provide a completely mechanical arrestor which permits normal movement of piping but, in the event the piping is subjected to a shock or other displacement force, serves as a rigid strut at the instant the shock force occurs.

Another object of the invention is to provide a shock and sway arrestor which may be advantageously employed in locations that are difficult or virtually impossible of access after installation has been completed.

A further object of the invention is to provide an arrestor of the type stated that is devoid of springs for absorbing shock or similar forces.

The invention has for a still further object the provision of an arrestor of the character indicated that is simple and compact in design; that is sturdy and durable in construction; that is reasonable in manufacturing and installation costs; that does not require servicing or maintenance; and that is capable of rendering efficient and dependable service over extended time periods.

The enumerated objects and additional objects, together with the advantages of the invention, will be readily apparent to persons trained in the art from the following detailed description and the accompanying drawing which respectively describe and illustrate several embodiments of arrestors constructed in accordance with this invention.

BRIEF DESCRIPTION OF THE DRAWING

In the drawing, wherein like reference characters denote corresponding parts in the several views.

DESCRIPTION OF THE PREFERRED EMBODIMENTS

Figure 1:
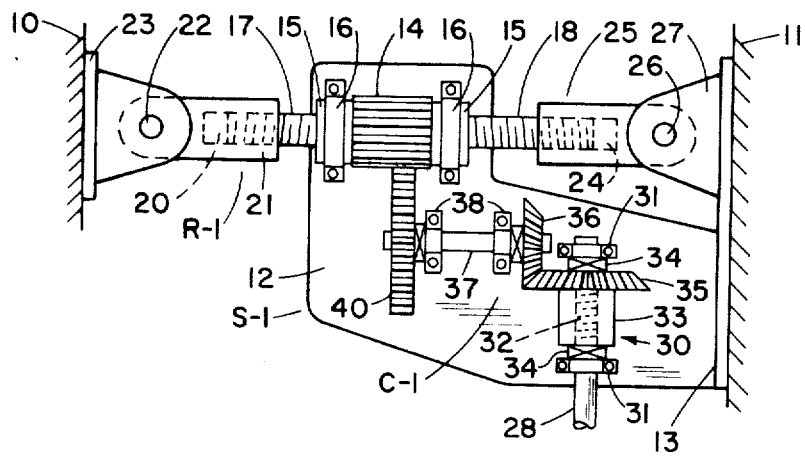
FIG. 1 is a front elevational view of first form of arrestor of this invention operatively connected to piping and to a stationary structure.

Reference is first had to FIG. 1 of the drawing which illustrates one form of arrestor of this invention, operatively connected to a stationary structure 10 and to piping 11, as will be described. The arrestor is comprised of support means S–1, a rigid strut unit R–1 and a control unit C–1.

Support means S–1, for the purposes of this disclosure, consists of a planar plate 12 and an integral flange 13 which is at a right angle to the plate and is anchored to piping 11, preferably by welding.

Rigid strut unit R–1 comprises an elongated gear 14 which is mounted at its ends for rotation in a pair of spaced bearings 15. The bearings are positioned in brackets 16 which are secured to plate 12. Coaxial with gear 14 is a pair of screw members 17 and 18 which are oppositely threaded. The screw members may be integral with gear 14 or, alternatively, secured to and rotatable with the gear member.

Screw member 17 engages the threads of a tapped blind opening 20 in one end of a first rod 21 which is pivotally connected at its other end, as indicated at 22, to a bracket 23 that is anchored, preferably by welding, to stationary structure 10. In like manner, screw 18 engages the threads of a tapped blind opening 24 in one end of a second rod 25 which is pivotally connected at its other end, as indicated at 26, to a bracket 27 that is anchored, preferably by welding, to piping 11.

Control unit C–1 comprises a rigid member 28 and a mechanism 30. Member 28 is adapted to be connected to piping 11 and to function in essentially the same manner as the corresponding member of my pending application Ser. No. 64,321, filed Aug. 17, 1970, i.e., move axially relative to piping 11 as the piping moves in response and in direct proportion to variations in thermal conditions.

Mechanism 30, as in the case of my application Ser. No. 64,321, serves the function of converting rectilinear motion of member 28 into rotary motion of parts that will be described further along herein. This mechanism comprises a pair of spaced bearings 31 which are mounted on plate 12 and a screw member 32 which is an extension of member 28 and is journalled for rotation in the bearings. Mechanism 30 also comprises a nut member 33 which is operatively associated with screw member 32. The mechanism is equipped with a pair of thrust bearings 34 which are positioned between bearings 31 and the corresponding ends of nut member 33.

Mechanism 30 is a low friction unit and is preferably a ball screw and nut unit of the type manufactured by Beaver Precision Products, Inc. of Troy, Michigan.

A bevel gear 35 is affixed to and rotatable with nut member 33. This gear meshes with a bevel gear 36 which is secured to one end of a shaft 37 that is journalled for rotation in a pair of spaced bearings 38 which are attached to plate 12. Secured to the other end of shaft 37 is a spur gear 40 which meshes with gear 14.

For the purpose of briefly describing the operation of the foregoing embodiment of the invention, it is first assumed that the parts are in the relative position shown in FIG. 1. With the parts in this position or, for that matter, any other relative position within the design limits, unit R-1 serves as a rigid strut between stationary structure 10 and piping 11 and effectively protects the piping against shock, vibrations or the like.

It will be appreciated from an examination of FIG. 1 that the arrestor permits normal movement of piping 11 relative to stationary structure 10 that unit R-1 continues to serve as a rigid strut regardless of such movement. If, for example, piping 11 normally moves, due to temperature conditions, toward the right, as seen in FIG. 1, it causes corresponding axial movement of member 28 and screw member 32 in one direction and rotary movement of gears 35, 36, 40 and 14 in corresponding directions. This, in turn, causes screw members 17 and 18 to turn in a direction whereby to increase the effective length of unit R-1 by an amount equal to distance the piping has moved to the right.

The arrestor operates in a reverse manner in response to normal movement of piping 11 toward the left, thereby decreasing the effecting length of unit R-1 by an equal amount.

Figure 2:
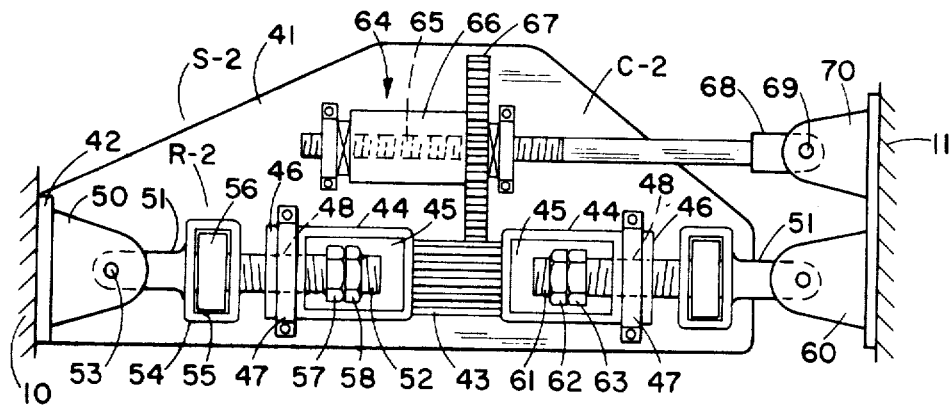
FIG. 2 is a view, corresponding to FIG. 1, of a second form of arrestor of this invention.

The form of the invention shown in FIG. 2 comprises support means S-2, a rigid strut unit R-2 and a control unit C-2.

Support means S-2 consists of a planar plate 41 and an integral flange 42 which is at a right angle to the plate and is anchored to stationary structure 10.

Rigid strut unit R-2 comprises an elongated gear 43 which is equipped at each end with a cage 44 that defines an opening 45. Gear 43 and cages 44 constitute a unitary assembly. Each cage has a circular end wall 46 which is journalled for rotation in a corresponding bearing 47 that is affixed to plate 41. Cage end walls 46 are formed with through taps 48 which are coaxial with gear 43.

The cage 44 at the left of gear 43 is connected to stationary structure 10 through the medium of an arrangement of devices including a bracket 50, a coupler 51 and a screw 52. Bracket 50 is anchored to the stationary structure, preferably by welding, and is pivotally connected to one end of coupler 51, as indicated at 53. The coupler has an enlarged part 54 at its other end which defines an opening 55. Screw 52 extends through an opening (not shown) in coupler part 54 and engages the tap 48 in corresponding cage end wall 46. This screw has a square head 56 which registers with opening 55 but is not rotatable relative to part 54. The screw carries lock nuts 57 and 58 which are located in cage opening 45.

The cage at the right of gear 43 is connected to piping 11 by a like arrangement of devices including a bracket 60, a coupler 51, a screw 61 and a pair of nuts 62 and 63. Screws 52 and 61 are threaded oppositely.

Control unit C-2 comprises a mechanism 64 which is similar to earlier described mechanism 30 and which includes a screw member 65, a nut member 66 and a spur gear 67 that is rotatable with the nut member and that meshes with gear 43. The unthreaded portion of the screw member is secured to a coupler 68 which is pivotally connected at 69 to a bracket 70 that is anchored to piping 11.

It will be evident from an examination of FIG. 2 that the arrestor illustrated therein serves as a rigid strut at all times regardless of the position of piping 11 relative to stationary structure 10. In this embodiment of the invention, screw member 65 is directly responsive to thermal movement of the piping in either direction and causes like and compensating changes in the effective length of strut unit R-2. Lock nuts 57, 58 and 62, 63 are adjusted along their respective screws 52 and 61 at the time of installation so as to limit increasing the effective length of unit R-2 to a value corresponding to maximum normal movement of piping 11 to the right. This condition obtains when nuts 57 and 63 engage corresponding cage end walls 46. Similarly, maximum normal movement of the piping to the left occurs and is limited by engagement of cage end walls 46 with corresponding coupler parts 54.

Figures 3, 4:
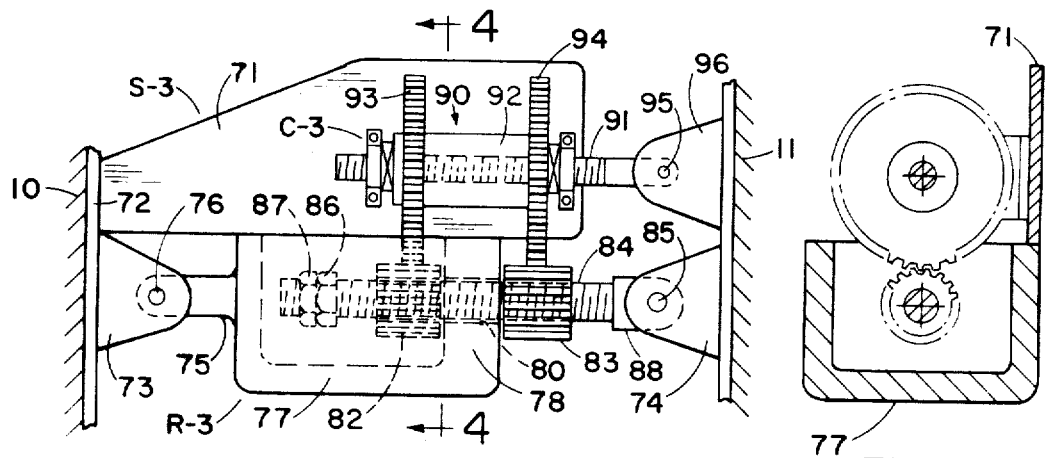
FIG. 3 is a view, also corresponding to FIG. 1, of a third form of arrestor of this invention.
FIG. 4 is a view taken along line 4—4 of FIG. 3.

Reference is next had to FIGS. 3 and 4 for an understanding of the construction of the therein illustrated arrestor of this invention. The form of the arrestor shown in these views comprises support means S-3, a rigid strut unit R-3 and a control unit C-3.

Support means S-3 is similar to the earlier described support means and consists of a planar plate 71 and an integral flange 72 which is at a right angle to this plate and is anchored to stationary structure 10.

Rigid strut unit R-3 comprises a pair of brackets 73 and 74 which are respectively anchored to stationary structure 10 and piping 11. A connector 75 is pivotally connected at one end to bracket 74, as indicated at 76, and is provided at its other end with a hollow body which includes an end wall 78. This wall is formed with a through opening 80 which is normal to the axis of the pivotal connection between connector 75 and bracket 73. The strut unit includes a pair of elongated gears 82 and 83 which are located to opposite sides of wall 78. These gears are provided with central through taps (not shown) which are coaxial with wall opening 80. A screw 84 extends through and threadedly engages the taps in gears 82 and 83. One end of this screw is pivotally connected to bracket 74, as indicated at 85, and the other end carries a pair of lock nuts 86 and 87. The screw is provided with a shoulder 88.

Control unit C-3 comprises a mechanism 90 which is closely related to mechanism 64 of FIG. 2 and which includes a screw member 91, a nut member 92 and a pair of spaced spur gears 93 and 94 which are carried by and rotatable with the nut member. Gears 93 and 94 mesh respectively with gears 82 and 83, as shown. Screw member 91 is pivotally connected at 95 to a bracket 96 which is anchored to piping 11.

As in the case of the earlier described arrestors, the arrestor of FIGS. 3 and 4 serves at all times as a rigid strut regardless of the position of piping 11 relative to support structure 10. As also in the case of the arrestor of FIG. 2, screw member 91 is directly responsive to thermal movement of the piping in either direction and causes like and compensating changes in the effective length of strut unit R-3. Lock nuts 86 and 87 are adjusted along screw 84 at the time the arrestor is installed so as to limit increasing the effective length of unit R-3 to a value corresponding to maximum normal movement of piping 11 to the right. This condition obtains when nut 86 engages gear 82. Also, maximum normal movement of the piping to the left occurs and is limited by engagement of gear 83 with shoulder 88.

The arrestor of FIGS. 3 and 4 contemplates a pair of independent gears 82 and 83. It is obvious that these gears may be joined to obtain a unitary gear unit by means of a tubular connector (not shown) which extends through wall opening 80. In that event, either gear 93 or gear 94 may be eliminated, allowing the remaining such gear to operate corresponding gear 82 or 83, as the case may be.

Based on the foregoing, it is believed that the construction, operation, objects and advantages of my present invention will be readily comprehended by persons skilled in the art without further description. It is to be clearly understood, however, that various changes in the constructions described above and illustrated in the drawing may be made without departing from the scope of the invention, it being intended that all matter contained in the description or shown in the drawing shall be interpreted as illustrative only and not in a limiting sense.

I claim:

1. An arrestor for use with piping and a stationary structure to protect the piping against shock loading, undesirable vibratory movement or the like, comprising:

a. support means;

b. a strut unit carried by the support means and comprising:
  1. a device adapted to be connected at one end to the piping and at its other end to the stationary structure and including:
    a. adjusting means intermediate its ends for varying the effective length of the strut unit and comprising:
      i. at least one screw and
      ii. at least one gear having a through tap, which is engaged by the screw, and peripheral teeth; and
  c. a control unit carried by the support means and engaging the peripheral teeth of the gear, said control unit being responsive to thermal movement of the piping whereby to actuate the adjusting means and correspondingly vary the effective length of the strut unit.

2. An arrestor according to claim 1 wherein the device further includes:
  a. means for pivotally connecting one end of the screw to the piping.

3. An arrestor for use with piping and a stationary structure to protect the piping against shock loading, undesirable vibratory movement or the like, comprising:
  a. support means;
  b. a strut unit carried by the support means and comprising:
    1. a device adapted to be connected at one end to the piping and at its other end to the stationary structure and including:
      a. adjusting means intermediate its ends for varying the effective length of the strut unit; and
  c. a control unit carried by the support means and engaging the adjusting means, said control unit being responsive to thermal movement of the piping whereby to actuate the adjusting means and correspondingly vary the effective length of the strut unit, said control unit comprising:
    1. a screw member carried by and movable axially relative to the support means in response to thermal movement of the piping;
    2. a nut member operatively associated with the screw member and rotatable in response to said axial movement of the screw member; and
    3. coupling means connecting the nut member to the adjusting means.

4. An arrestor according to claim 3 wherein
  a. the adjusting means comprises a first gear and
  b. the coupling means comprises a second gear which meshes with the first gear.

5. An arrestor according to claim 3 wherein the control unit includes:
  a. means for pivotally connecting the screw member to the piping.

6. An arrestor for use with piping and a stationary structure to protect the piping against shock loading, undesirable vibratory movement or the like, comprising:
  a. support means;
  b. a strut unit carried by the support means and comprising:
    1. a device adapted to be connected at one end to the piping and at its other end to the stationary structure and including:
      a. adjusting means intermediate its ends for varying the effective length of the strut unit, and comprising:
        i. coaxial first and second screws and
        ii. a gear positioned between and connected to the screws; and
  c. a control unit carried by the support means and engaging said gear, said control unit being responsive to thermal movement of the piping whereby to actuate the adjusting means and correspondingly vary the effective length of the strut unit.

7. An arrestor according to claim 6 wherein the first and second screws are threaded oppositely.

8. An arrestor according to claim 7 wherein the gear and the first and second screws are rotatable in unison.

9. An arrestor according to claim 7 including:
  a. first means threadedly connecting one end of the gear to the first screw; and
  b. second means threadedly connecting the other end of the gear to the second screw.

10. An arrestor for use with piping and a stationary structure to protect the piping against shock loading, undesirable vibratory movement or the like, comprising:
  a. support means;
  b. a strut unit carried by the support means and comprising:
    1. a device adapted to be connected at one end to the piping and at its other end to the stationary structure and including:
      a. adjusting means intermediate its ends for varying the effective length of the strut unit, and comprising:
        i. a screw element;
        ii. a connector element having an opening in and through which the screw element is respectively rotatable and slidable;
        iii. means for connecting one of said elements to the piping and the other of said elements to the stationary structure; and
        iv. at least one gear having a through tap, which is engaged by the screw element, and peripheral teeth, said gear being positioned to one side of the connector element; and
  c. a control unit carried by the support means and engaging said gear, said control unit being responsive to thermal movement of the piping whereby to actuate the adjusting means and correspondingly vary the effective length of the strut unit.

11. An arrestor according to claim 10 including a pair of gears, each of said gears being positioned to a corresponding side of the connector element and engaging the control unit.

* * * * *